United States Patent
Kosut et al.

(10) Patent No.: US 10,404,088 B2
(45) Date of Patent: Sep. 3, 2019

(54) POWER DISTRIBUTION USING BIDIRECTIONAL POWER CONNECTOR

(71) Applicant: Apple Inc., Cupertino, CA (US)

(72) Inventors: Alexei E. Kosut, Mountain View, CA (US); Paul M. Thompson, San Jose, CA (US); Parin Patel, Cupertino, CA (US); Alan C. Cooney, Cupertino, CA (US); Glen A. Rhodes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 510 days.

(21) Appl. No.: 15/174,336

(22) Filed: Jun. 6, 2016

(65) Prior Publication Data

US 2017/0025862 A1    Jan. 26, 2017

Related U.S. Application Data

(60) Provisional application No. 62/172,085, filed on Jun. 6, 2015.

(51) Int. Cl.
*H02J 7/00* (2006.01)

(52) U.S. Cl.
CPC ...... *H02J 7/0063* (2013.01); *H02J 2007/0067* (2013.01)

(58) Field of Classification Search
CPC .......................... H02J 7/0063; H02J 2007/0067
See application file for complete search history.

(56) References Cited

U.S. PATENT DOCUMENTS

| | | | | |
|---|---|---|---|---|
| 5,969,529 | A * | 10/1999 | Eiraku ............... | G01R 31/3648 320/136 |
| 8,390,255 | B1 * | 3/2013 | Fathollahi ............ | H02J 7/0045 206/308.3 |
| 8,620,391 | B2 * | 12/2013 | Edwards ........... | H04M 1/72558 455/179.1 |
| 9,684,352 | B2 * | 6/2017 | Yi ........................ | G06F 1/263 |
| 2005/0286212 | A1 * | 12/2005 | Brignone .............. | G06F 1/1632 361/679.4 |
| 2012/0116601 | A1 * | 5/2012 | Yano ...................... | G06F 1/263 700/292 |
| 2013/0278205 | A1 * | 10/2013 | Mullins ................... | G06F 21/44 320/107 |

(Continued)

*Primary Examiner* — Pinping Sun
(74) *Attorney, Agent, or Firm* — Kilpatrick Townsend & Stockton LLP (57) ABSTRACT

Methods, circuits, and apparatus to distribute power among devices in an electronic system where a device may receive power from more than one source, may have a bidirectional power connector, or both. One example may resolve conflicts when an electronic device receives power from more than one source. In this example, the device may determine which source may provide the most power, and may select to receive power from the power source that may deliver the most power. Other examples may have a preference to receive power from a particular source or via a specific connector. Other examples may switch from receiving power over a first connector to providing power over the first connector, while others may receive and provide power over different connectors at the same time. Another may be connected to a battery, and may draw power from the battery or not depending on the type of battery.

16 Claims, 8 Drawing Sheets

(56) References Cited

U.S. PATENT DOCUMENTS

| | | | |
|---|---|---|---|
| 2014/0106676 A1* | 4/2014 | Yarger | H04M 1/72527 455/41.2 |
| 2014/0136863 A1* | 5/2014 | Fritchman | G06F 1/26 713/310 |
| 2014/0265564 A1* | 9/2014 | Lim | H02J 7/35 307/18 |
| 2015/0057859 A1* | 2/2015 | Yamamoto | B60T 7/12 701/22 |
| 2015/0089248 A1* | 3/2015 | Obie | G06F 1/266 713/300 |
| 2015/0181413 A1* | 6/2015 | Singamsetti | H04W 52/0261 455/418 |
| 2015/0189058 A1* | 7/2015 | Hwang | A45C 11/00 455/575.8 |
| 2015/0312666 A1* | 10/2015 | Park | H04R 1/1025 381/74 |
| 2015/0357864 A1* | 12/2015 | Gofman | H02J 7/0045 307/66 |
| 2016/0087488 A1* | 3/2016 | Ghazarian | H02J 9/061 307/19 |
| 2016/0140911 A1* | 5/2016 | Kim | G09G 3/3406 315/160 |
| 2017/0018938 A1* | 1/2017 | Kari | H04M 1/72527 |
| 2017/0149270 A1* | 5/2017 | Adams | H02J 7/025 |
| 2017/0207425 A1* | 7/2017 | Chun | H01M 2/1022 |

\* cited by examiner

POWER DISTRIBUTION USING BIDIRECTIONAL POWER CONNECTOR

CROSS REFERENCE TO RELATED APPLICATIONS

This application claims the benefit of U.S. provisional patent application No. 62/172,085, filed Jun. 6, 2015, which is incorporated by reference.

BACKGROUND

The number and types of electronic devices that are commercially available have increased tremendously the past few years and the rate of introduction of new devices shows no signs of abating. Devices, such as tablet, laptop, netbook, desktop, and all-in-one computers, cell, smart, and media phones, storage devices, portable media players, navigation systems, monitors, and others, have become ubiquitous.

Power and data may be provided from one device to another over cables that may include one or more wire conductors, fiber optic cables, or other conductor. Connector inserts may be located at each end of these cables and may be inserted into connector receptacles in the communicating or power transferring devices.

Power and data may be distributed among these devices in various ways. For example, power may be provided by a charger to a host device. A portion of this power may be used to charge a battery in the host device. In other configurations, a host may receive power from a charger and provide power to an accessory at the same time.

In such conventional systems, distributing power is often straight forward. But devices may have power connectors that may either provide or receive power over one of the connector contacts. This means that a device may have a bidirectional power connector that may receive power or provide power to a device that is connected to the bidirectional power connector. Moreover, other may receive power over two or more connectors. This may cause conflicts as the device attempts to receive power. The presence of multiple connectors or bidirectional power connectors may confuse devices attempting to distribute power in an electronic system.

Thus, what is needed are methods, circuits, and apparatus to distribute power among devices in an electronic system where a device may receive power from one or more sources or may have a bidirectional power connector.

SUMMARY

Accordingly, embodiments of the present invention may provide methods, circuits, and apparatus to distribute power among devices in an electronic system where a device may receive power from one or more sources or may have a bidirectional power connector. These and other embodiments of the present invention may provide methods, circuits, and apparatus to distribute power among devices in an electronic system where a device may receive power from one or more sources and may have a bidirectional power connector.

An illustrative embodiment of the present invention may provide methods, circuits, and apparatus that may resolve conflicts when an electronic device receives power from more than one source. In various embodiments of the present invention, an electronic device may receive power from more than one source, may determine which source may provide the most power, and may select to receive power from the power source that may deliver the most power.

In these and other embodiments of the present invention, the device may receive power from more than one source, but may have a preference for either the connector that the power is received on, or for the type of source that is providing the power. In these embodiments, the device may always choose the preferred connector or preferred source. In these and other embodiments, the device may choose the preferred connector or preferred source unless a less preferred connector or source is able to provide power at a level that is a first threshold above the level of the preferred connector or preferred source.

In one specific embodiment of the present invention, a device may be able to receive power from a first source at a first connector receptacle of the device and from a second source at a second connector of the device. The device may determine that it may receive a first amount of power from the first source and a second amount of power from the second source. The device may determine that the first amount of power is greater and may selectively receive power from the first source. In these and other embodiments of the present invention, there may be a preference for the device to receive power at the second connector. In this case, the device may selectively receive power from the second source via the second connector. In these and other embodiments of the present invention, the device may selectively receive power from the second source via the second connector unless the first source may provide power at a level that is a first threshold above the second amount of power, in which case the device may selectively receive power from the first source via the first connector, despite the preference for the second connector. In these and other embodiments of the present invention, there may be a preference for the device to receive power from a type of source, where the second source is of the preferred type. In this case, the device may selectively receive power from the second source. In these and other embodiments of the present invention, the device may selectively receive power from the second source unless the first source may provide power at a level that is a first threshold above the second amount of power, in which case the device may selectively receive power from the first source, despite the preference for the second source.

In embodiments of the present invention, these preferences may be based on various criteria. For example, some connectors may be more prone to corrosion, or some connectors may be more visible and corrosion may be of more concern. It may be therefore be desirable that corrosion due to dendritic growth be controlled by using that connector only on a limited basis, and thus there may be a preference to use another connector on the device. It may also be preferable to use a charger or power adapter as a power source over using a battery as a power source, since the battery may be useful for only a limited number of cycles and using it as a power source may shorten the time before it needs to be recharged. In other embodiments of the present invention, particularly where a device may receive power from three or more sources, a device may have certain connectors or sources that are undesirable sources of power. For example, where corrosion on a first connector is a concern, it may be undesirable to use that connector to receive power, even if there is no preference for one or more other connectors on the device.

In these and other embodiments of the present invention, an electronic device may determine an amount of available power in one of many ways. For example, one of the power sources may be received at a lightning connector receptacle on an electronic device. The lightening connector receptacle may have contacts for a Universal Serial Bus (USB) data pair. These contacts may convey USB signals from a power source where the USB signals indicate a level or amount of power that the power source may convey. Other power sources may have one or more resistors connected to their USB contacts or pins. These one or more resistors may be measured by the electronic device to determine an available power level. In other situations, the electronic device may measure a voltage provided on the USB contacts by the one or more resistors of the power source, and from these voltages an available power level may be determined. In various embodiments of the present invention, the USB signals or resistor configurations used may be part of the USB or other standard, or may be signals or resistor configurations that are proprietary to a manufacture of either or both the electronic device and the power source. For example, the signals may be compliant with the USB power delivery (USB-PD) specification. In still other embodiments of the present invention, the lightning connector may have a serial port, and contacts for the serial port may receive signals from the power source that may indicate a level or amount of power that the power source may provide.

In these and other embodiments of the present invention, one of the power sources may be another type of connector. This connector may have three contacts, a bidirectional power contact, a ground contact, and a bidirectional data contact. The bidirectional data contact on the device may convey a signal from a power source that may indicate a level or amount of power that the power source may provide.

In these and other embodiments of the present invention, an electronic device may determine a level of power that may be provided by a power source by reading identification or authentication information from the power source.

In these and other embodiments of the present invention, an electronic device determining an amount of power that a source can provide may further account for intermediate electronic devices between the source and the determining device. For example, a docking station for a device may be placed between a power source and the electronic device. The electronic device may read a power level from the power source and may subtract a known or determined power used by the docking station in determining a net power that may be received by the electronic device. This may then be compared to one or more other power sources as outlined above.

In these and other embodiments of the present invention, an electronic device may read an available power level from a power adapter or other power source via an intermediate device, such as docking station. In some embodiments, the power adapter and docking station communicate using a first protocol, while the docking station and electronic device communicate using a second protocol. In this case, commands and information formatted in the first protocol may be encapsulated and tunneled to the device using the second protocol. This tunneling may be done in a one-to-one manner, with each command in the first protocol being encapsulated as a single command in the second protocol, or other more complicated encapsulation algorithms may be used.

In these and other embodiments of the present invention, the encapsulation may be used to send data from the device to the charger. For example, the device may have a firmware or software upgrade for the charger, and may pass this upgrade back to the charger via the docking station.

In these and other embodiments of the present invention, a device may alternate between receiving power and providing power. For example, a charger providing power through a docking station to an electronic device may be disconnected from the docking station. The electronic device may then need to alternate from receiving power from the docking station to providing power to the docking station. Even where this changeover does not need to be seamless, it may be desirable to limit a duration during which the docking station is not receiving power. Accordingly, these and other embodiments of the present invention may provide a device that can quickly alternate from receiving power to providing power. In these and other embodiments of the present invention, the intermediate device, such as the docking station, may include a charge storage circuit to temporarily provide power during this transition. These charge storage circuits may also be included on other attached devices. These charge storage circuits may provide other benefits. For example, when a keyboard or other input device attached to a docking station has a charge storage circuit, the keyboard may remain functional when temporarily disconnected from the docking station due to the forces involved in typing on the keyboard.

In these and other embodiments of the present invention, a device may simultaneously receive and provide power. For example, a device may receive power from a charger or power adapter and provide power to charge an external battery. The device may determine how much power it may receive from the charger or power adapter. The device may determine how much power it needs to power itself. The device may then allocate the remaining power to charge a battery internal to the device as needed, and provide any remaining power to the external battery.

In these and other embodiments of the present invention, a device having an internal battery may be connected to an external battery. The device may determine the type of external battery that is connected, and draw power from it depending on what type of battery it is. For example, an external battery may be connected via a cable to the device. From the presence of the cable, it may be inferred that the external battery may be disconnected in the future. From this, it may be determined that it may be desirable to draw power from the external battery and save power in the internal battery. The power drawn from the external battery may be used to power the device, to charge the internal battery, or both, depending on the status of the internal battery and the capability of the external battery. For example, where the internal battery is low on power and the external battery has a large capability, the external battery may be used to charge the internal battery.

In other situations, the external battery may be directly connected to the device. For example, the battery may be part of a case or cover for the device, where contacts of the battery may connect directly to contacts of the device. When such a configuration is detected, the device may draw power from the internal battery. Drawing power from the internal battery may be more efficient than drawing power from the external battery, and the external battery is not likely to be disconnected in the near term.

In these and other embodiments of the present invention, a device may determine whether an external battery is at least part of a case or cover or connected through a cable in various ways. For example, the device may receive authentication or identification information from the external battery, a cable, or other associated component.

Embodiments of the present invention may provide circuits, methods, and apparatus for power distribution that may be located in and may connect to various types of devices, such as portable computing devices, tablet computers, desktop computers, laptops, all-in-one computers, cell phones, smart phones, media phones, storage devices, portable media players, navigation systems, monitors, power supplies, adapters, remote control devices, chargers, and other devices. These devices may include connector receptacles that may provide pathways for signals and power compliant with various standards such as Universal Serial Bus (USB), a High-Definition Multimedia Interface (HDMI), Digital Visual Interface (DVI), power, Ethernet, DisplayPort, Thunderbolt, Lightning and other types of standard and non-standard interfaces that have been developed, are being developed, or will be developed in the future.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
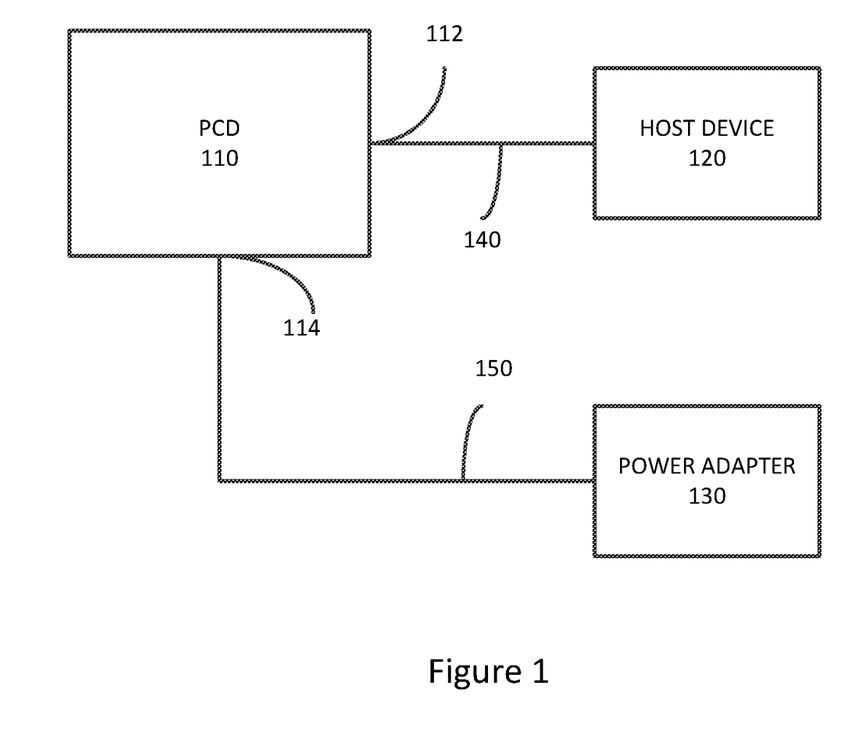
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

This figure includes an electronic device connected to two separate power sources, though the electronic device may be connected to three or more power sources. Specifically, an electronic device, in this case may portable computing device 110, may be connected to receive power from a first power source, host device 120, and a second power source, charger or power adapter 130. Portable computing device 110 may include a first connector receptacle 112 for making a connection 140 to host device 120, and a second connector receptacle 114 for making a connection 150 to power adapter 130. Either or both connections 140 and 150 may be cables or they may be direct connections. For example, connection 150 may be a direct connection where contacts or pins of power adapter 130 are in physical contact with contacts or pins of connector 114 on portable computing device 110.

Portable computing device 110 may be a phone, laptop, note book, tablet, storage device, remote control device, or other type of portable computing device. Portable computing device 110 may have a first connector 112 and a second connector 114, where either or both connectors may be a USB, such as a USB type C, a High-Definition Multimedia Interface (HDMI), Digital Visual Interface (DVI), power, Ethernet, DisplayPort, Thunderbolt, Lightning and other types of standard and non-standard interfaces that have been developed, are being developed, or will be developed in the future. In still other embodiments the present invention, either or both connector receptacles 112 and 114 may be a proprietary connector having a bidirectional power pin, a bidirectional data pin, and a ground pin. In these and other embodiments the present invention, portable computing device 110 may be coupled to other types of power providing devices such as batteries, uninterruptible power supplies, and other types of chargers or charge storage devices. In each example, a connection, such as connection 140 or 150 or the other connections shown herein may be a cable, a direct connection, or other electronic pathway.

Figure 2:
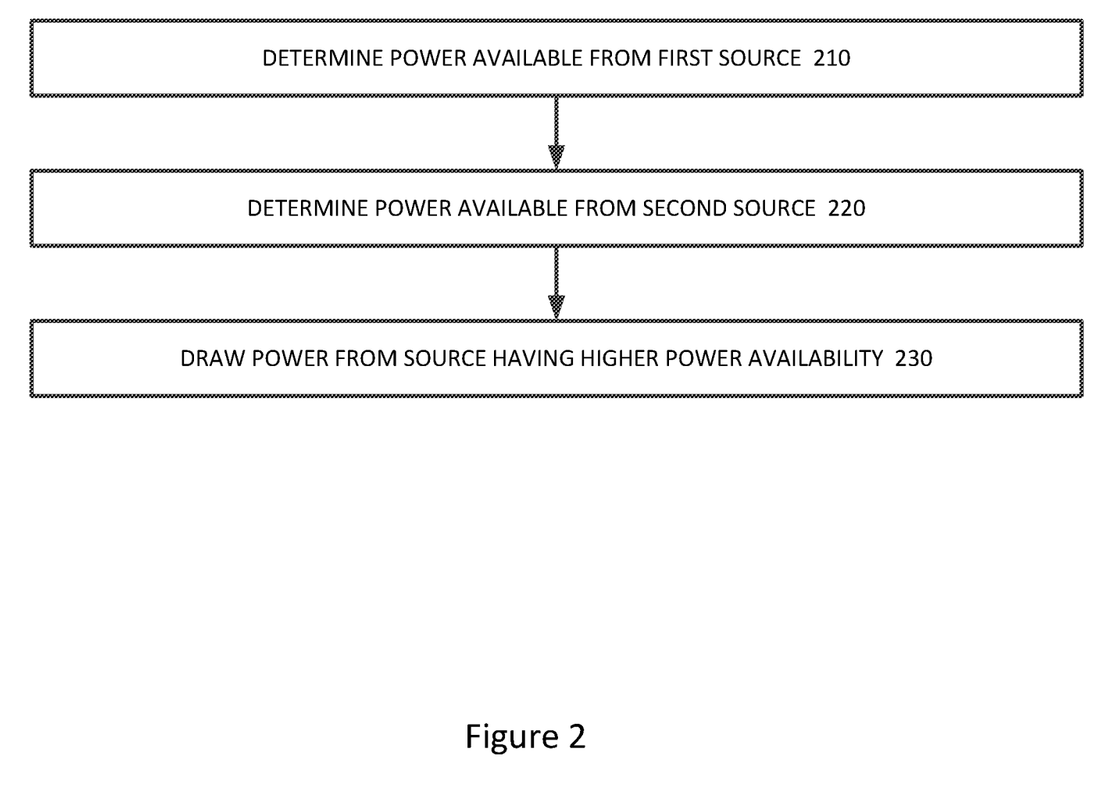
FIG. 2 illustrates a method of distributing power according to an embodiment of the present invention.

Portable computing device 110 may be able to receive power from host device 120 via first connector 112 or from power adapter 130 via second connector 114. In various embodiments of the present invention, portable computing device 110 may determine which of the two available power sources, host device 120 or charger or power adapter 130, may provide the most power. Portable device 110 may then selectively draw power from the power source having the higher power capability. An example is shown in the following figure.

FIG. 2 illustrates a method of distributing power according to an embodiment of the present invention. In act 210, an electronic device may determine a level of power available from a first source. The electronic device may further determine a level of power available from a second source in act 220. In act 230, the electronic device may draw power from the source determined to have the higher power availability.

In these embodiments of the present invention, an electronic device, such as the portable computing device 110, may selectively draw power from whichever power source connected to the electronic device has the highest power providing capability. In other embodiments of the present invention, a preference may exist for receiving power using either a particular connector on the electronic device or from a particular power source connected to the electronic device. In these embodiments, power may always be drawn via the preferred connector or from the preferred source when possible. Put another way, it may be undesirable to draw power using a particular connector on the electronic device or from a particular power source connected to the electronic device. In these embodiments, an electronic device may avoid drawing power using the particular connector or from the particular source, either at all time or whenever possible.

In other embodiments of the present invention, where a preference exists, power may be drawn via the preferred connector or from the preferred source, unless another power source is capable of providing power at a level that is at least a threshold level of power more than the preferred power source or the power source connected to the preferred connector receptacle may provide. Similarly, where it is undesirable to use a particular connector or particular source, that connector or power source may not be used unless it is capable of providing power at a level that is at least a threshold level of power above any other available connector or power source.

Figure 3:
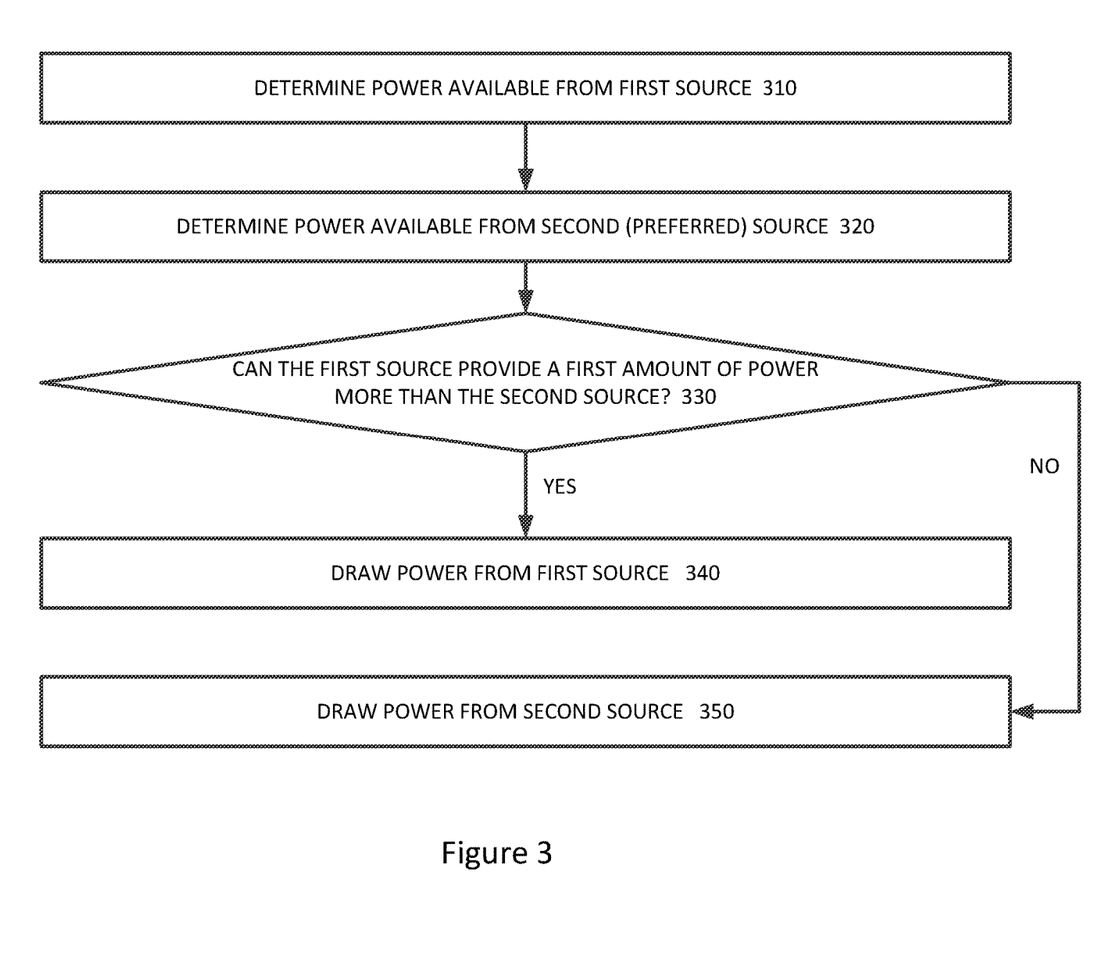
FIG. 3 is a flowchart of a method of distributing power according to an embodiment of the present invention.

As a specific example, a particular connector of electronic device may be either susceptible to corrosion, or the connector may be highly visible and therefore corrosion of one or more contacts of the connector may be undesirable. In such case, another connector of the electronic device may be used unless a power source connected to this highly visible connector is capable of providing power at a level that is at least a threshold above any other available power source. A flowchart of this method is shown in the following figure.

FIG. 3 is a flowchart of a method of distributing power according to an embodiment of the present invention. In this method, an electronic device may determine a level of power that is available from a first source in act 310. In act 320, the electronic device may determine a level power available from a second source. In this example, the electronic device may have a preference for receiving power from a second power source. This preference may be based on a preference for the type of source that the second power source is, or it may be based on a preference for a connector of the electronic device that the second source is attached to.

Accordingly, device may determine whether the first source may provide a first amount, or threshold amount, of power more than a second source. If the answer is yes, power may be drawn from the first source in act 340. The answer is no, the preference is not overcome, and power may be drawn from the second source in act 350.

In various embodiments of the present invention, an electronic device may use various techniques to determine a power providing capability of a power source. For example, one of the power sources may be received a lightning connector receptacle on an electronic device. The lightening connector receptacle may have contacts for a USB data pair. These contacts may convey USB signals from a power source where the USB signals indicate a level or amount of power that the power source may convey. Other power sources may have one or more resistors connected to their USB contacts or pins. These one or more resistors may be measured by the device to determine an available power level. In other situations, the device may measure a voltage provided on the USB contacts by the one or more resistors of the power source, and from these voltages an available power level may be determined. In various embodiments of the present invention, the USB signals or resistor configurations used may be part of the USB or other standard, or may be signals or resistor configurations that are proprietary to a manufacture of either or both the device and the power source. For example, the signals may be compliant with the USB power delivery (USB-PD) specification. In still other embodiments of the present invention, the lightning connector may have a serial port, and contacts for the serial port may receive signals from the power source that may indicate a level or amount of power that the power source may provide.

In these and other embodiments of the present invention, one of the power sources may be another type of connector. This connector may have three contacts, a bidirectional power contact, a ground contact, and a bidirectional data contact. The bidirectional data contact on the device may convey a signal from a power source that may indicate a level or amount of power that the power source may provide.

In these and other embodiments of the present invention, an electronic device may determine a level of power that may be provided by a power source by reading identification or authentication information from the power source.

Figure 4:
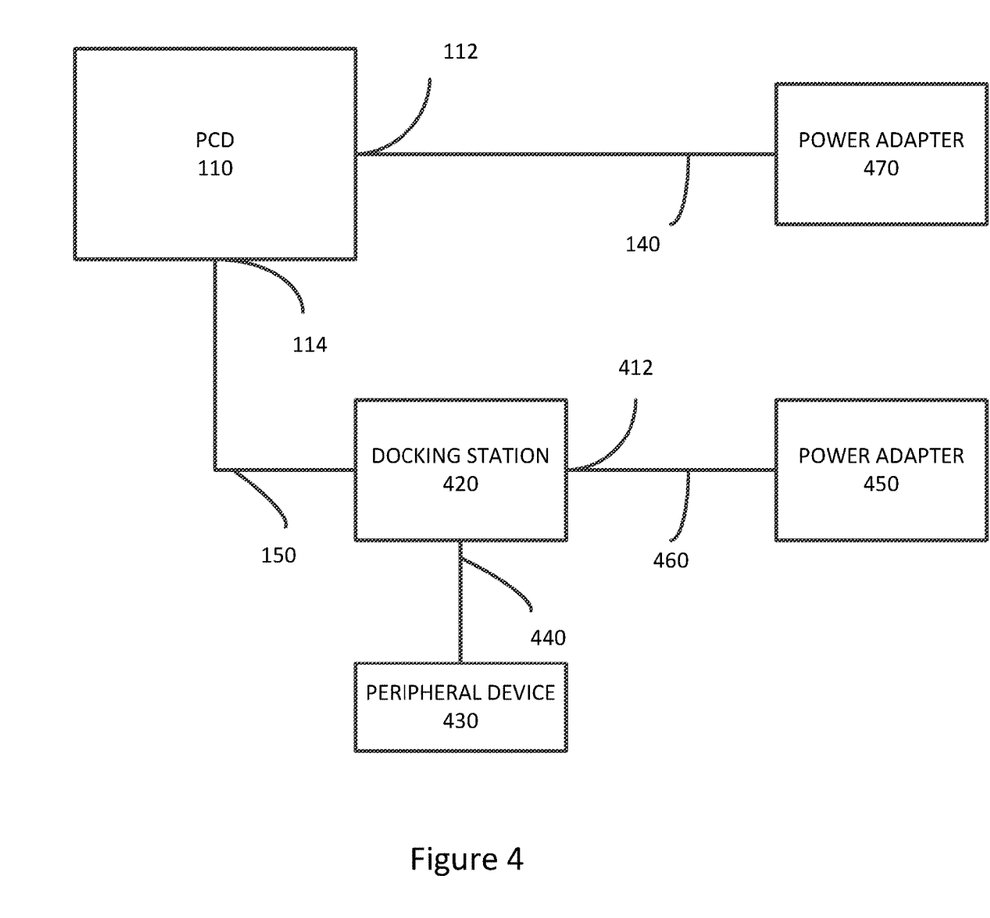
FIG. 4 illustrates an electronic system according to an embodiment of the present invention.

In the above examples, an electronic device may simply compare power that may be provided by two or more sources and selectively draw power from one of the sources as outlined. In other embodiments of the present invention, a power source may provide power to an intermediate device that may be in series with, or parallel to, the electronic device. The power drawn by the intermediate device may then be subtracted from the power capability of the power source to determine a net power level available to the electronic device. The net power level may be used in determining which power source to draw power from, again as outlined above. An example is shown in the following figure.

FIG. 4 illustrates an electronic system according to an embodiment of the present invention. In this example, portable computing device 110 may receive power at a first connector receptacle 112 from a power adapter 470 via cable 140. Portable computing device 110 may also be capable of receiving power using a second connector 114 connected through cable or connection 150 to docking station 420. Docking station 420 may receive power from power adapter 450 via connector 412 and cable 460. Docking station 420 may also power other devices, such as peripheral device 430 via cable or connection 440, where peripheral device 430 may be a storage drive, an input device, such as a touchpad, keyboard, or microphone, audio output device, or other type of peripheral device.

In this particular example, power adapter 470 may be capable of providing a first amount of power over cable 140 and connector receptacle 112 of portable computing device 110. Power adapter 450 may be capable of providing a second amount power via cable 460 and connector receptacle 412. Docking station 420 and peripheral device 430 may consume a third amount of power. Accordingly, docking station 420 may be able to provide the second amount of power less the third amount of power to portable computing device 110 via cable 150 and connector receptacle 114. The portable computing device may then selectively draw power either from power adapter 470 or from docking station 420 in the manner outlined above. Specifically, portable computing device 110 may select power from source capable of providing the highest level of power, portable computing device 110 may select to draw power from a preferred power source or via a preferred connector, portable computing device 110 may avoid using a particular connector or power source and may use an alternative instead, portable computing device 110 may select a preferred power source unless an alternative source can provide a power level that is a first threshold above the preferred power source, or portable computing devices 110 may avoid using a particular connector or power source unless it is capable of providing at least a threshold level of power more than an alternative source.

Figure 5:
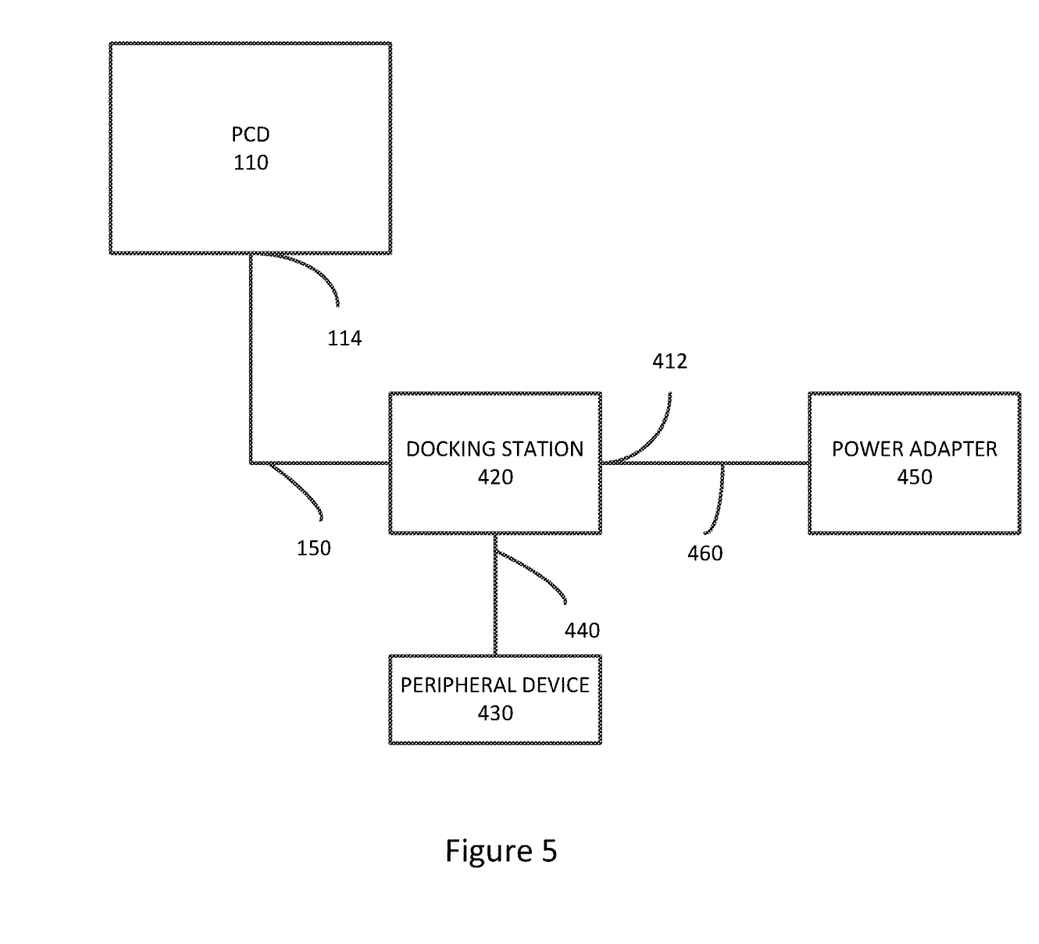
FIG. 5 illustrates an electronic system according to an embodiment of the present invention.
Figure 6:
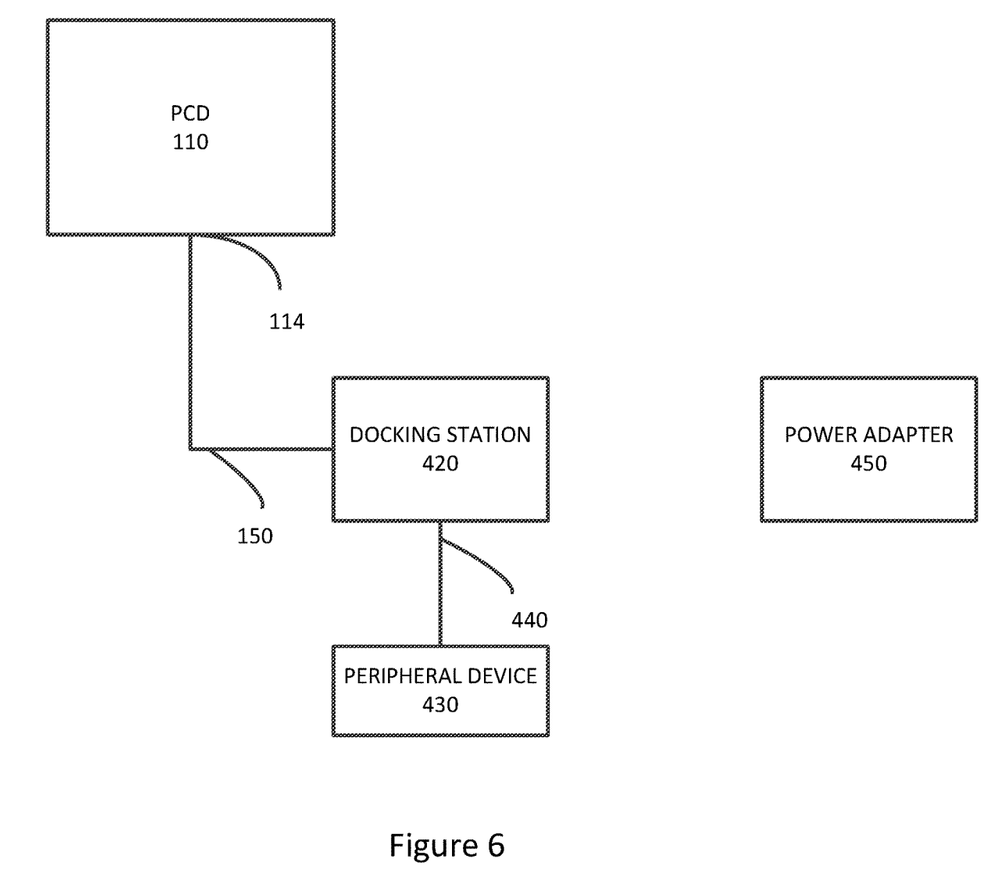
FIG. 6 illustrates the electronic system of FIG. 5 where a power source has been disconnected.

In the above examples, a source may be preferred if it is a particular type of source, or it may be a desirable to use a particular power source if it is of a particular type. In this example, portable computer device 110 may recognize that since it is sitting in docking station 420, power adapter 470 may be removed. Accordingly, portable computing device 110 may choose to draw power from docking station 420. By drawing power from docking station 420, portable computing device 110 may also be able to quickly recognize when power adapter 450 is disconnected from docking station 420. This may help speed the delivery of power from portable computing device 110 to docking station 420 after power adapter 450 is disconnected. This fast power changeover may reduce or eliminate the duration that docking station 420 is without power following a disconnect of power adapter 450. This is shown in the following figures.

FIG. 5 illustrates an electronic system according to an embodiment of the present invention. In this example, portable computer device 110 may receive power at its connector receptacle 114 from docking station 420 via cable 150. Docking station 420 may also supply power to peripheral device 430 over cable or connector 440. Docking station 420 may receive power at its connector receptacle 412 from power adapter 450 via cable 460.

In various embodiments of the present invention, cables or connections 460 and 150 may be of different types. For example, power adapter 450 may communicate with docking station 420 over a USB type-C to lightning cable, where receptacle 412 is a lightning connector receptacle. Docking station 420 may communicate over a proprietary cable or connection 150 with portable computing device 110, where receptacle 114 may be a proprietary receptacle having a bidirectional power pin, a bidirectional data pin, and a ground pin.

In this example, it may be desirable for the portable computing device 110 to communicate with power adapter 450. This communication may include the power adapter 450 informing the portable computing device 110 about its power capability. Such communications may also involve software or firmware updates for the power adapter 450 that may be provided by portable computing place 110. Communications may be sent from power adapter 450 to portable computing device 110 by sending signals consistent with a first protocol over cable 460 from power adapter 450 to docking station 420. Docking station 420 may encapsulate this data so that the signals may tunnel using a second protocol over cable or connection 150 to portable computing device 110. Similarly, signals may be routed from portable computing device 110 to power adapter 450 by encapsulating signals such that they may tunnel using the second protocol over cable or connection 150 to docking station 420. Docking station 420 may un-encapsulate signals and provide them over cable 460 to power adapter 450.

In electronic systems where power is being delivered to a device from a power source through an intermediate device, when the power source is disconnected, the device may need to assume the role of providing power to the intermediate device. An example is shown in the following figure.

FIG. 6 illustrates the electronic system of FIG. 5 where a power source has been disconnected. Specifically, power adapter 450 has been disconnected. In order to maintain functionality of docking station 420, portable computing device 110 may provide power via connector receptacle 114 to docking station 420 over cable or connection 150. Further, it may be desirable to switch from receiving power to providing power quickly. That is, it may be desirable to change the portable computing device 110 from a power receiving device to a power providing device in a rapid fashion. Moreover, to further compensate for delays in this changeover, one or more devices, such as docking station 420 or peripheral device 430, may contain one or more charge storage circuits. These charge storage circuits may be used to power their devices or other circuitry during the power changeover following the disconnection of power adapter 450. In some situations, these charge storage circuits may provide other utility. For example, providing a charge storage circuit on peripheral device 430 when peripheral device 430 is a keyboard may allow the keyboard to remain powered during disconnections from docking station 420, which may occur due to the forces involved in typing on the keyboard. Charge storage circuits that may be used may be found in U.S. provisional patent application 62/129,797, titled POWER ROUTING FOR DONGLES AND ADAPTERS, which is incorporated by reference.

Figure 7:
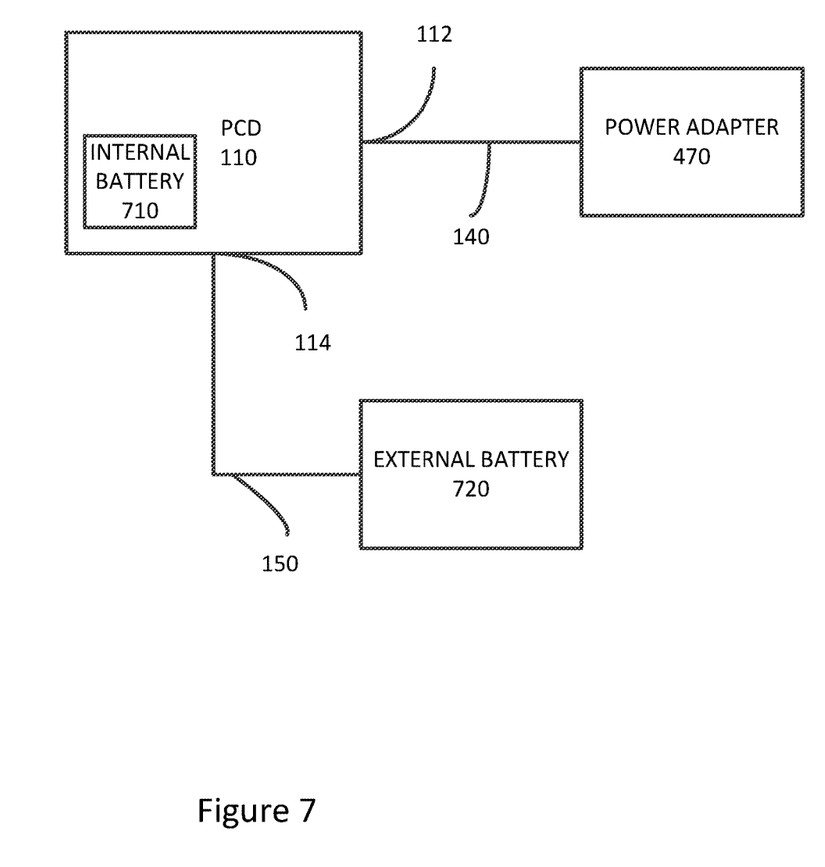
FIG. 7 illustrates an electronic system according to an embodiment of the present invention.

In various embodiments of the present invention, a device may simultaneously receive and provide power. An example is shown in the following figure.

FIG. 7 illustrates an electronic system according to an embodiment of the present invention. In this example, portable computer device 110 may receive power from power adapter 470 and may provide power to charge external battery 720. In such a configuration, portable computer device 110 may determine them an amount of power that may be provided by power adapter 470. Portable computer device 110 may know or determine an amount of power that it may consume and may subtract this from the power provided by power adapter 470 to determine a first net power. This first net power may be used to charge internal battery 710 as needed. Any net power still remaining may be provided to charge external battery 720. Further, when internal battery 710 is charged, or at least sufficiently charged, that power may also be used to charge extra battery 720.

Figure 8:
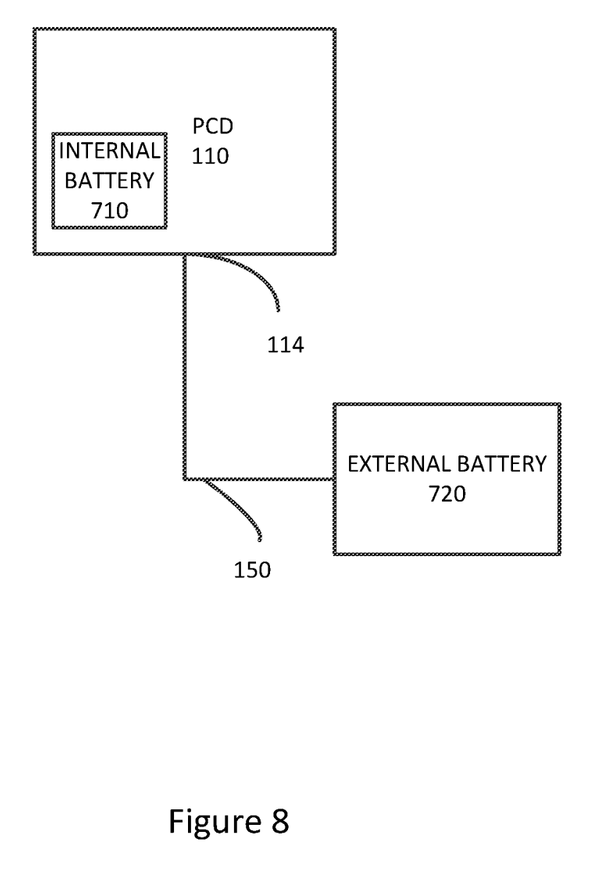
FIG. 8 illustrates an electronic system according to an embodiment of the present invention.

In various embodiments of the present invention, a device may be connected to an external battery. The device may need to determine whether to draw power from an internal battery or from the external battery. An example is shown in the following figure.

FIG. 8 illustrates an electronic system according to an embodiment of the present invention. In this example, portable computing device 110 may be connected to external battery 720. Portable computers 110 may further include an internal battery 710. Portable computer device 110 may draw power from either the internal battery 710 or external battery 720. In various embodiments of the present invention, various criteria may be used in making a determination as to which battery to draw power from.

In one embodiment of the present invention, the portable computing device 110 determines whether the external battery 720 is connected to portable computer device 110 in a way as to make it effectively part of the portable computing device 110. For example, portable computing device 110 may determine whether external battery 720 is at least part of a case, cover, or other structure that may effectively be part of or intimately attached to portable computing device 110. When external battery 720 is at least part of the case or cover, it may be desirable to draw power from the internal battery 720. For example, it may be more efficient to draw power from an internal battery 710. Also, external battery 720 is not likely to be removed in the short-term and its power will be available later. Moreover, when portable computer device 110 is later charged, it may again be more efficient to charge internal battery 710.

Conversely, portable computing device 110 may determine that external battery 720 is remote. For example, external battery 720 may be connected through cable or connection 150. In this case, it may be likely that external battery 720 may be removed during use of the portable computing device 110, so portable computing device 110 may draw power from external battery 728 before drawing power from internal battery 710.

In various embodiments of the present invention, portable computing device 110 may determine this information by authentication or identification information received from external battery 720.

Embodiments of the present invention may provide circuits, methods, and apparatus for power distribution that may be located in and may connect to various types of devices, such as portable computing devices, tablet computers, desktop computers, laptops, all-in-one computers, cell phones, smart phones, media phones, storage devices, portable media players, navigation systems, monitors, power supplies, adapters, remote control devices, chargers, and other devices. These devices may include connector receptacles that may provide pathways for signals and power compliant with various standards such as Universal Serial Bus (USB), a High-Definition Multimedia Interface (HDMI), Digital Visual Interface (DVI), power, Ethernet, DisplayPort, Thunderbolt, Lightning and other types of standard and non-standard interfaces that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of distributing power in an electronic system, the method comprising, with an electronic device in the electronic system:
    detecting a presence of an external battery connected to the electronic device;
    determining whether the external battery is connected to the electronic device via a cable; and
    if it is determined that the external battery is connected to the electronic device via the cable, then drawing power from the external battery to power the electronic device, otherwise,
    if it is determined that the external battery is connected to the electronic device and is not connected to the electronic device via the cable, then not drawing power from the external battery to power the electronic device and drawing power from an internal battery to power the electronic device.

2. The method of claim 1 wherein the electronic device determines that the external battery is connected to the electronic device via the cable by reading authentication information from the cable.

3. The method of claim 1 wherein the electronic device determines that the external battery is not connected to the electronic device via the cable by reading authentication information from a case for the electronic device.

4. The method of claim 1 wherein the electronic device determines that the external battery is not connected to the electronic device via the cable by reading authentication information from a cover for the electronic device.

5. The method of claim 1 wherein power drawn from the external battery is used to power the electronic device and charge the internal battery of the electronic device.

6. The method of claim 1 wherein if the external battery is in a case for the electronic device, then drawing power from the internal battery of the electronic device.

7. The method of claim 1 wherein if the external battery is in a cover for the electronic device, then drawing power from the internal battery of the electronic device.

8. A method of distributing power in an electronic system, the method comprising, with an electronic device in the electronic system:
    detecting a presence of an external battery connected to a connector of the electronic device;
    reading data over the connector of the electronic device;
    from the read data, determining whether the external battery is part of a case for the electronic device; and
    if it is determined from the read data that the external battery is part of the case for the electronic device, then not powering the electronic device with the external battery and powering the electronic device with an internal battery; otherwise,
    if it is determined from the read data that the external battery is not part of the case for the electronic device, then powering the electronic device with the external battery.

9. The method of claim 8 wherein the read data comprises identifying information for the external battery.

10. The method of claim 9 wherein if the identifying information for the external battery indicates that the external battery is connected through a cable then drawing power from the external battery.

11. The method of claim 8 wherein the read data comprises authentication information for the external battery.

12. The method of claim 11 wherein if the authentication information for the external battery indicates that the external battery is connected through a cable then drawing power from the external battery.

13. The method of claim 8 wherein when the read data is provided by a cable, then drawing power from the external battery.

14. An electronic system comprising an electronic device and an external battery, the electronic device comprising:
    an internal battery;
    a connector coupled to the external battery; and
    circuitry to:
        detect a presence of the external battery connected to the connector;
        read data over the connector;
        from the read data, determining whether the external battery is part of one of a case or cover for the electronic device; and
        if it is determined from the read data that the external battery is part of one of the case or cover for the electronic device, then not powering the electronic device with the external battery and powering the electronic device with THE internal battery; otherwise,
        if it is determined from the read data that the external battery is not part of one of the case or cover for the electronic device, then powering the electronic device with the external battery.

15. The electronic system of claim 14 wherein when the read data indicates that the external battery is connected through a cable, then drawing power from the external battery.

16. The electronic system of claim 14 wherein when the read data is provided by a cable, then drawing power from the external battery.

* * * * *